(12) United States Patent
Kuzee et al.

(10) Patent No.: US 6,559,301 B1
(45) Date of Patent: May 6, 2003

(54) DISPERSING AGENT

(75) Inventors: Hendrika Cornelia Kuzee, Oost Souburg (NL); Hendricus Wilhelmus Carolina Raaijmakers, Roosendaal (NL)

(73) Assignee: Cooperatie Cosun U.A., Roosendaal (NL)

( * ) Notice: Subject to any disclaimer, the term of this patent is extended or adjusted under 35 U.S.C. 154(b) by 0 days.

(21) Appl. No.: 09/719,286

(22) PCT Filed: Jun. 9, 1999

(86) PCT No.: PCT/NL99/00359

§ 371 (c)(1),
(2), (4) Date: Dec. 11, 2000

(87) PCT Pub. No.: WO99/64143

PCT Pub. Date: Dec. 16, 1999

(30) Foreign Application Priority Data

Jun. 11, 1998 (NL) .............................................. 1009379

(51) Int. Cl.[7] .......................... C08B 37/18; C08B 37/00
(52) U.S. Cl. ..................... 536/123.1; 536/4.1; 536/124; 536/119; 536/18.6; 536/18.5
(58) Field of Search ................................ 536/4.1, 123.1, 536/1.11, 124, 119, 18.6, 18.5

(56) References Cited

U.S. PATENT DOCUMENTS 4,342,866 A    8/1982    Kang et al.

FOREIGN PATENT DOCUMENTS

| EP | 0 077 680 | 4/1983 |
|---|---|---|
| EP | 0 189 292 | 7/1986 |
| WO | WO 98/25972 | 6/1998 |

*Primary Examiner*—Samuel Barts
*Assistant Examiner*—Michael C. Henry
(74) *Attorney, Agent, or Firm*—Young & Thompson

(57) ABSTRACT

Dispersions of pigment, such as calcium carbonate, titanium dioxide and types of clay, can be effectively stabilized by the use of carboxyl-containing fructan in an amount of 0.05–10% by weight, based on the dispersion, which fructan contains 0.5–3 carboxyl groups per mono-saccharide unit. The carboxyalkyl groups are in particular carboxymethyl groups, but the carboxyl groups can also be carboxyl groups obtained entirely or partially by oxidation. The carboxymethylfructan gives results which are comparable to or better than those obtained with the polyacrylates which are less desirable from the standpoint of health and environment.

10 Claims, 1 Drawing Sheet

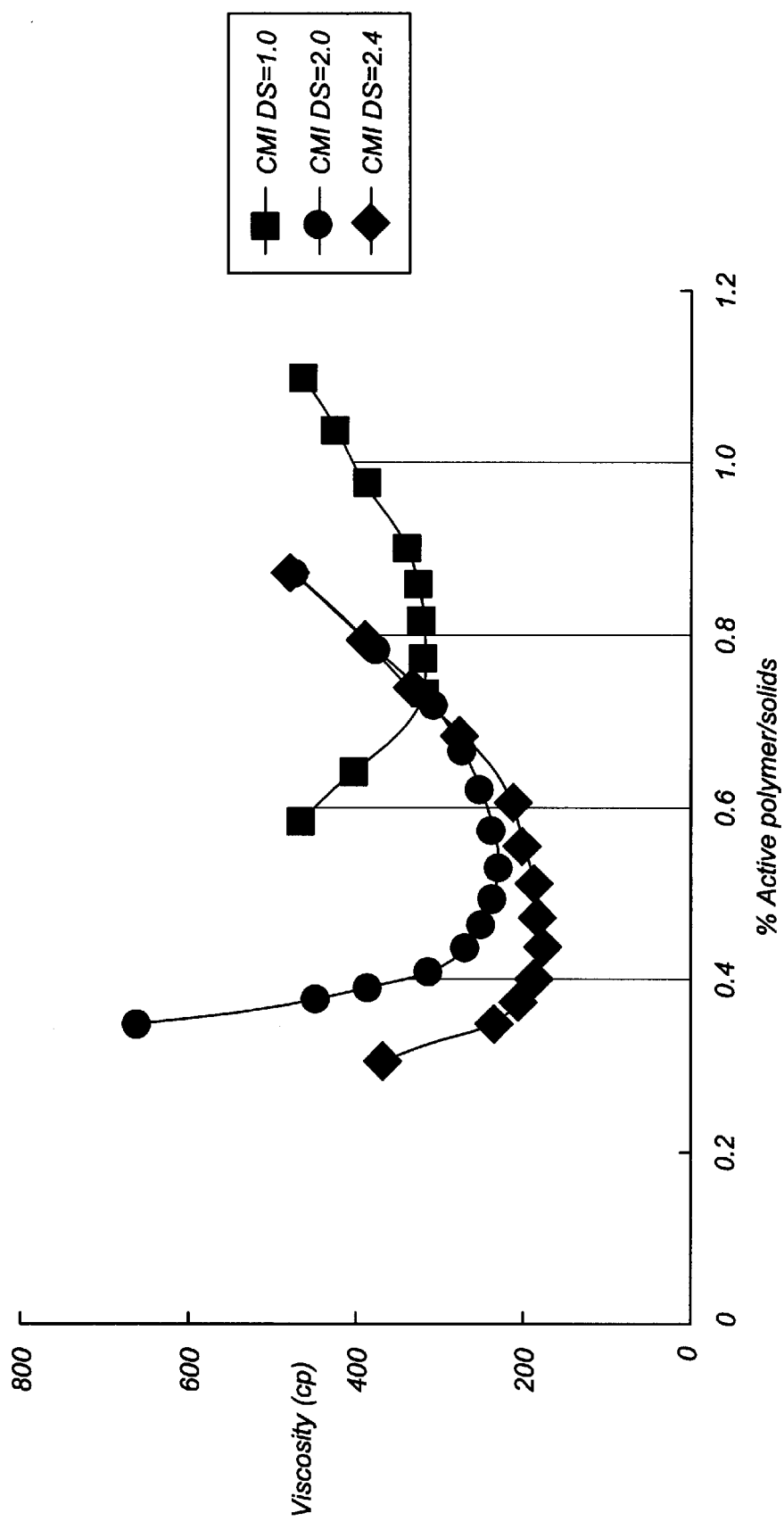

DISPERSING AGENT

This Application is the National Phase of PCT/NL99/000359 filed, 06/09/1999.

The invention relates to the use of specific fructan derivatives as a dispersing agent.

Dispersed solid particles usually have the tendency to flocculate and/or to precipitate. A dispersing agent prevents this flocculation and as a result stabilises the dispersion. In addition, a dispersing agent lowers the viscosity of the dispersion. As a result the dispersions can be pumped or processed more easily at higher concentrations of solid particles. This is important both from the technical and from the economic standpoint.

Phosphates and polyphosphates, such as sodium hexametaphosphate, are widely used as inorganic dispersing agents. These inorganic agents have a good dispersing action but have the disadvantage that they are not stable to hydrolysis. As a result, the viscosity of the dispersion will increase in the course of time.

Organic dispersing agents used are polymers and copolymers of acrylic acid and methacrylic acid having a molecular weight of 5,000 to 100,000. For instance, dispersions of more than 50% by weight of solid particles (such as clay particles) with a polyacrylate as dispersing agent are described in WO 95/25146. DE-A 2 700 444 describes the use of copolymers of maleic acid, JP-A-56-115630 that of unsaturated sulphonic acids and EP-A 705 893 that of phosphonocarboxylic acids as dispersing agents or as deflocculants.

The disadvantage of the organic dispersing agents used to date is that they are all based on petrochemical, and thus non-renewable, raw materials. Furthermore, these substances are poorly degradable and/or toxic to surface water or soil. There is therefore a need for organic dispersing agents which score better than the known petrochemical products with regard to these aspects.

It has been found that carboxyl-containing fructans and salts thereof meet this need. These derivatives have a dispersing action for solid substances, in particular pigments, are biodegradable and are non-toxic. The invention therefore relates to a method for the preparation of dispersions and to dispersions obtainable in this way, as described in the appended claims.

In this context fructans are understood to include all oligosaccharides and poly-saccharides which have a majority of anhydrofructose units. The fructans can have a polydisperse chain length distribution and can be straight-chain or branched. The fructan can contain mainly β-2,6 bonds, as in levan. Preferably the fructan contains mainly β-2,1 bonds, as in inulin.

In this context carboxyl-containing fructans are understood to be a derivative of inulin or another fructan that contains 0.3–3 carboxyl groups per anhydrofructose unit. In particular the derivative contains at least 0.8 carboxyl groups per anhydrofructose unit. The carboxyl groups can be present in the form of carboxyalkyl groups, such as carboxymethyl, carboxyethyl, dicarboxymethyl or carboxyethoxycarbonyl groups. These can be obtained by etherification of the fructan in a known manner. The carboxyl groups can also be present in the form of oxidised hydroxymethylene or hydroxymethyl groups. Mixed carboxyfructans can also be used. Preferably, the number of carboxymethyl groups is greater than the number of other carboxyl groups. Carboxymethylinulin (CMI) is the most preferred.

Carboxymethylinulin (CMI) with a DS (degree of substitution) of 0.15–2.5 is disclosed in WO 95/15984 and in the article by Verraest et al. in *JAOCS,* 73 (1996) pp. 55–62. It is prepared by reaction of a concentrated solution of inulin with sodium chloroacetate at elevated temperature. Carboxylethylinulin (CEI) is disclosed in WO 96/34017. The oxidation of inulin is, for example, disclosed in WO 91/17189 and WO 95/12619 (C3–C4 oxidation, leading to dicarboxyinulin, DCI) and WO 95/07303 (C6 oxidation). In the case of mixed carboxyl derivatives the inulin can have been first carboxymethylated and then oxidised or (preferably) the other way round.

The carboxyl-containing fructan has an average chain length (=degree of polymerisation, DP) of at least 3, rising to about 1000. Preferably, the average chain length is 6–60 monosaccharide units. The fructan can optionally have been subjected to a reduction treatment beforehand in order to remove reducing groups.

Modified fructan derivatives which according to the invention can be converted to carboxyalkylfructan are, for example, fructans in which the chain length has been enzymatically extended, and fructan hydrolysis products, that is to say fructan derivatives having a shortened chain, and fractionated products having a modified chain length. Fractionation of fructans such as inulin can be effected by, for example, low temperature crystallisation (see WO 94/01849), column chromatography (see WO 94/12541), membrane filtration (see EP-A 440 074 and EP-A 627 490) or selective precipitation with alcohol. Prior hydrolysis to produce shorter fructans can, for example, be effected enzymatically (endo-inulinase), chemically (water and acid) or by heterogeneous catalysis (acid column). Hydroxyalkylated and/or cross-linked fructans also come into consideration for use in the method according to the invention after carboxyalkylation and, if appropriate, oxidation.

The carboxymethylfructan can be used in the form of the purified substance, but use can also be made of the technical grade product obtained directly by carboxymethylation. Specifically, it has been found that any impurities, such as glycolic acid and diglycolic acid, have no adverse effects on the action of the CMI. It is possible to make use of the free acid, but also of a salt, such as the sodium, potassium or ammonium salts.

The solid to be dispersed or suspended can be any solid which is sufficiently chemically inert to be able to be dispersed or suspended in water. The particles are usually inorganic and insoluble in water. Examples are talc, barite, calcium carbonate, mica, kaolin, bentonite and other types of clay, zinc oxide, calcium sulphate, zeolite, carbon, haematite and the like. The carboxyfructans can be used as dispersing agents for soluble or semi-soluble solids.

Dispersions of calcium carbonate and titanium dioxide can be used in paints and other coating compositions. Other widely used pigments which can be dispersed using the carboxyfructans according to the invention are, for example, iron oxide, carbon black and aluminium stearate. The pigment can also be a corrosion-inhibiting pigment, such as red lead, zinc oxide, zinc powder or aluminium powder, citrates and the like. It is also possible to prepare bentonite dispersions, which can be used as softeners in, for example, detergents and weighting materials in drilling muds; Furthermore, the carboxyfructans can be used for a wide variety of dispersions of low viscosity, for coating paper. Pigments which can be used for this purpose are, for example, kaolin, satin white, calcium carbonate and talc. Other uses are e.g. in dispersing mining products.

For rapid dispersion the particle size of the solids is preferably as small as possible, preferably less than 1 mm and in particular between 1 and 50 μm. The solids concentration is 1–90% by wt based on the total weight of the dispersion. From the economic standpoint, the concentration is at least 30% by wt rising to, for example, 80% by wt.

The carboxyl-containing fructan can first be mixed with the pigment (or other substance to be dispersed or to be suspended) and then added to the water, or it can first be added to the water before the pigment is added with vigorous stirring.

The quantity of carboxyl-containing fructan, in particular CMI, is in general between 0.05 and 10% by wt, in particular between 0.2 and 2% by wt. It is also possible to use mixtures of the carboxyl-containing fructan and other dispersing agents, such as polyacrylates or phosphonates, preferably in a ratio of at least I part carboxyl-containing fructan to one part other agent. The pH of the dispersion system is usually neutral to slightly. alkaline (pH 6–12); the pH is often above 7. If necessary, other solvents, such as alcohols, can be added to the water; however water usually suffices.

The carboxyl-containing fructans have a dispersing action, expressed in number of mols carboxyl groups that is required per tonne dry pigment (see WO 97/10308), which is as good as or even better than that of polyacrylates.

EXAMPLES

Example 1

CMI with a DS (degree of substitution; average number of substituents per monosaccharide unit) of 2.4 and 100% DCI were compared with a commercial polyacrylate (PA, mol. wt. 4500) that is used for dispersing calcium carbonate in the paints industry. An initial dosage of dispersing agent was added to 250 g $CaCO_3$ (Socal P2, Solvay) in 150 g water. Small dosages of dispersing solution were then added to the dispersion. The concentration of the dispersing solutions was 1% solids. After each addition the viscosity of the dispersion was measured at 25° C. using a Brookfield viscometer. The results are given in Table 1.

TABLE 1

| % Dispersing agent with | Viscosity (Pas) | | |
|---|---|---|---|
| respect to pigment | CMI | DCI | PA (comp.) |
| 0 | 16.3 | 16.3 | 16.3 |
| 0.05 | 14.2 | 11.2 | 16.5 |
| 0.075 | 12.2 | 9.3 | 16.6 |
| 0.10 | 8.8 | 7.1 | 11.2 |
| 0.125 | 5.5 | 4.7 | 5.2 |
| 0.15 | 2.9 | 3.2 | 4.2 |

Example 2

The viscosity of the following paint formulation (parts by weight) was determined 1 day and 28 days after making up and storing at 50° C.

| water | 274.5 |
|---|---|
| Tylose MH 30000 yp2 | 3 |
| NaOH 10% | 1 |
| Calgon N 10% | 5 |
| Tiona RCL-535 | 30 |
| Socal P2 | 120 |
| Omyacarb 2 GU | 120 |
| Omyacarb 5 GU | 280 |
| Industrie Spezial | 100 |
| Mowilith LDM 1871 | 60 |

-continued

| Mergal K9N | 2 |
|---|---|
| Byl 033 | 2 |
| Dispersing agent 30% in water | 2.5 |

The results are as follows:

| | Viscosity (mPas) | |
|---|---|---|
| Dispersing agent | After 1 day | After 28 days |
| Polyacrylate A (comparative) | 5000 | 4600 |
| Polyacrylate B (comparative) | 5500 | 5700 |
| CMI DS 1.5 | 6100 | 7600 |
| CMI DS 2.4 | 4800 | 4600 |
| DCI 60% | 600 | 5700 |
| DCI 100% | 5500 | 5700 |

Example 3

Various CMI products were compared with a commercial polyacrylate in the dispersion of calcium sulphoaluminate of the formula $3CaOAl_2O_3.3CaSO_4.32H_2O$. The concentration of the slurry was 50%. It was investigated how much dispersing agent at 30° C. is needed to reduce the viscosity of the slurry to 25 mPas (Brookfield viscometer 60 rpm). It can be seen from the results given below that compared with the polyacrylate in particular the CMI products with a relatively low DS require fewer carboxyl groups to lower the viscosity to the set value.

| Dispersing agent | Consumption % based on wet slurry | Carboxyl groups % based on wet slurry |
|---|---|---|
| CMI DS 0.5 | 0.94 | 0.16 |
| CMI DS 1.0 | 0.82 | 0.23 |
| CMI DS 1.5 | 0.83 | 0.30 |
| CMI DS 2.5 | 0.90 | 0.42 |
| Polyacrylate A (comp.) | 0.44 | 0.31 |

Example 4

Effect of the carboxyl content of CMI on dispersion of kaolin.

An initial dosage of dispersing agent was added to 269.4 g kaolin in 115.5 g water. Small dosages of dispersing solution were then added to the dispersion. The concentration of the dispersing solutions was 40% solids. After each addition the viscosity of the dispersion was measured at 25° C. using a Brookfield viscometer. The results are given in the appended figure.

What is claimed is:
1. A method for preparing a stable dispersion of solids in an aqueous medium using a polycarboxy compound, characterised in that a carboxyl-containing fructan that contains 0.3–3 carboxyl groups per monosaccharide unit is incorporated in the medium and/or in the solids.
2. A method according to claim 1, wherein 0.05–10% by wt of the carboxyl-containing fructan is used, based on the solid to be dispersed.
3. A method according to claim 1, wherein the carboxyl-containing fructan contains at least 0.8 carboxyl group per monosaccharide unit.
4. A method according to claim 1, wherein the carboxyl-containing fructan contains 0.7–2.5 carboxymethyl groups per monosaccharide unit.

5. A method according to claim 1, wherein the carboxyl-containing fructan is a carboxymethylinulin having an average degree of polymerisation of 6–60.

6. A method according to claim 1, wherein the solid to be dispersed is a pigment or a type of clay.

7. A method according to claim 1, wherein a product obtained directly by carboxyalkylation of a fructan is used.

8. A method according to claim 1, wherein a purified carboxyalkylfructan is used.

9. A stable dispersion of a pigment in an aqueous medium, which contains 1–90% by wt of the pigment and 0.002–5% by wt of a carboxyl-containing fructan that contains 0.3–3 carboxyl groups per monosaccharide unit, the percentages by weight being based on the total weight of the dispersion.

10. A stable dispersion according to claim 9, which contains 30–80% by wt of the pigment and 0.015–3% by wt of the carboxyl-containing fructan, based on the dispersion.

* * * * *